United States Patent Office 3,197,322
Patented July 27, 1965

3,197,322
PREPARATION OF CALCIUM CARBONATE AND
THE COMPOSITION SO MADE
John Maskal and Ivan M. Thompson, Ludington, Mich.,
assignors to The Dow Chemical Company, Midland,
Mich., a corporation of Delaware
No Drawing. Filed July 25, 1962, Ser. No. 212,448
8 Claims. (Cl. 106—306)

This invention pertains to the preparation of calcium carbonate. More particularly it pertains to the preparation of calcium carbonate in a particular form which is especially suitable for paper treatment.

In paper manufacture, the pigments, fillers and coating materials, e.g., inorganic carbonates, are applied to the paper to increase the brightness and flexibility and to improve the printability thereof. The main function of the pigments and fillers is to fill the interstices between the fibers in the base paper so that a smooth level surface is obtained upon calendering the treated paper. Generally the pigment or filler is applied to the paper by coating the paper with an aqueous slurry containing the pigment or filler and an adhesive.

The adhesives used in the paper treatment are relatively expensive. Consequently, it is generally desirable for economic reasons to employ the least amount of adhesive that will bind a fixed quantity of the pigment or filler satisfactorily to the paper. The adhesive requirement varies widely not only with the different materials used as pigments but with the same material which, through methods of manufacture or otherwise, has different characteristics. In fact, a relatively cheap pigment which has a high adhesive requirement may be more expensive to use than a more expensive pigment requiring comparatively less adhesive.

One of the materials commonly used as a mineral coating for paper is calcium carbonate. While calcium carbonate may be made by a number of methods, the products obtained by these different methods vary widely as to the desirability for paper coating. In addition to having a low adhesive requirement, it is desirable that the material have an excellent whiteness, a good hiding power, and give a good finished surface to the paper upon its application. In the application of calcium carbonate in the coating of paper, the calcium carbonate is usually prepared in fine particle size, then dried and shipped as a dry product to a paper manufacturer who reslurries the dry product by admixing it with a suitable amount of an adhesive in sufficient water to give the desired consistency. To reslurry the calcium carbonate, extensive agitation must be used to obtain a satisfactory product. Unless such agitation is provided, agglomerates of the calcium carbonate particles will remain and, unless dispersed prior to application on the paper being coated, an unsatisfactory coating results. Shipping of calcium carbonate as a slurry without drying has heretofore not been practical because the concentration of the calcium carbonate therein has been low, resulting in high shipping costs. The concentration of the slurry could not be increased sufficiently to make it economical because when the slurries contained over about 50 percent calcium carbonate they could not be readily pumped. Furthermore, slurries of calcium carbonate appear to be dilatant so that, upon movement, the pumpability thereof further decreases.

It is, therefore, an object of this invention to provide an improved process for the preparation of calcium carbonate. A further object is to provide a calcium carbonate product which is especially suitable for paper coating. Another object is to provide a pumpable calcium carbonate slurry containing over 60 weight percent of calcium carbonate, suitable for paper coating.

The aforementioned and related objects are attained, according to the invention, by the steps indentified (A), (B) and (C) below:

(A) Admixing, in an aqueous medium, (1) $CaCO_3$ crystals from a previously prepared batch, (2) $CaCl_2$, and (3) a mixture of $Mg(OH)_2$ and $Ca(OH)_2$ in a molar ratio of $Ca(OH)_2$ to $Mg(OH)_2$ of between about 0.5 and 2.0. Usually the $Mg(OH)_2$ and $Ca(OH)_2$ in the mixture are in a substantially equimolar ratio such as is provided by either water- or brine-slaking a calcined natural dolomite. The $Mg(OH)_2$ and $Ca(OH)_2$ mixture, which as stated, is usually slaked calcined dolomite and will be referred to, hereinafter as slaked dolime. The amounts of the ingredients employed in the practice of the invention, on a dry weight basis are:

(1) Between 0.5 and 15 parts of previously prepared $CaCO_3$,
(2) Between 76 and 118 parts of $CaCl_2$, and
(3) 100 parts of slaked dolime.

The molar ratio of $Mg(OH)_2$ from the dolime to the $CaCl_2$ present is between about 0.7 and about 1.1. However, it is preferred that the molar ratio be not over 1.0 because the excess of $Mg(OH)_2$ then remains in the product, which is undesirable.

The aqueous slurry to be carbonated contains dry ingredients (i.e., total solids) between about 12 and 46 percent by weight. Of these dry ingredients, between about 6.6 and about 19.8 weight percent, based on the weight of the slurry, and preferably between about 13.2 and 15.8 weight percent, is slaked dolime.

(B) Carbonating the aqueous slurry prepared according to (A) above at an initial carbonation temperature of between about 20° and about 35° C. by passing a gas therethrough which contains between about 10 and 25 percent by volume $CO_2$, for from about 8 to about 20 hours. There is thus produced a mixture of calcite and aragonite crystals of $CaCO_3$ having a median particle size of 0.6 to 1.2 microns and a distribution of particles as follows:

95–100% by weight less than 10 micron equivalent spherical diameter.
85–97% by weight less than 5 micron equivalent spherical diameter.
60–87% by weight less than 2 micron equivalent spherical diameter.
50–76% by weight less than 1.2 micron equivalent spherical diameter.
25–50% by weight less than 0.6 micron equivalent spherical diameter.

The term equivalent spherical diameter as used herein has the significance given to it in Andreasen's sedimentation method for the determination of particle size distribution as described in Jr. of the American Ceramic Society, vol. 21, pages 393–399 (1938), entitled, "Grain Size of Whiteware Clays as Determined by Andreasen Pipette," by George Loomis. Usually we prefer a median $CaCO_3$ particle size of between 0.8 and 1.2 microns, at least between about 25 and about 40 percent by weight smaller than 0.6 micron, at least between about 13 and 40 percent by weight greater than 2.0 microns, and not over about 2 percent by weight larger than 10 microns in size. The product thus obtained is recovered as a precipitate from the reaction mixture, such as by filtration. In preferred practice a portion of the $CaCO_3$ slurry is not filtered but is retained for admixture with additional slaked dolime and subsequent carbonation.

(C) Filtering, washing, and pulping, i.e., creaming the product so obtained and thereafter refiltering and repulping the product at least two more times (a total of at least three times) to obtain a filter cake containing at least about 65 percent calcium carbonate. Filtering is best carried out by aid of a vacuum. Repulping and filtering are aided by admixture of a small amount of a surfactant with the creamed product and such practice is recommended.

The washed cake is then usually reslurried with a limited amount of additional water to give a slurry containing between about 55 and 65 percent by weight calcium carbonate. The slurry so obtained is readily pumpable at a total solids which is clearly higher than heretofore known $CaCO_3$ slurries. Moreover it has a whiteness of over 98 percent and a low adhesive requirement when used in paper coating as demonstrated by standard tests. The standard test usually employed consists of measuring the percent of light reflectance from a dry coating of the material tested in relation to a coating of MgO, considered to have 100 percent reflectance, by means of a spectrophotometer, e.g., General Electric Recording Spectrophotometer.

It is unusual and unexpected to obtain a calcium carbonate product having a median particle size of from 0.8 to 1.2 microns which will give a pumpable slurry at concentrations above 55 percent. It is believed that the product obtained by the above process results in a product having the desired characteristics due to the particular mixture of type of crystals and size distribution of these crystals. Slurries which are pumpable have viscosities of less than 15 poises as determined by a Stormer viscosimeter modified as described by J. A. Geddes and D. H. Dawson in Industrial Engineering Chemistry, volume 34, pages 163–167 (1942).

In the preparation of the calcium carbonate for use in the invention, a mixture of $Mg(OH)_2$ and $Ca(OH)_2$ may be used which consists of a molar ratio of $$\frac{Ca(OH)_2}{Mg(OH)_2}$$

of at least 0.5. When a ratio of less than 0.5 is present the amount of aragonite crystals falls below the requisite percentage. When the ratio exceeds about 2.0, the slurry made therefrom tends to become more viscous than is desirable. Therefore, a mixture of $Mg(OH)_2$ and $Ca(OH)_2$ in an acceptable molar ratio may be made up. However, naturally occurring dolomites are usually used. Most dolomite consists essentially of substantially equimolar double carbonates of magnesium and calcium. Normally existing impurities found in the dolomite do not have any detectable deleterious effect when used in the invention.

To carry out the invention according to the preferred practice, dolomite is calcined (i.e., heated at between about 1000° and 1300° C.), to convert the carbonates of calcium and magnesium to calcium oxide and magnesium oxide. The calcined dolomite is then slaked. Either water or a $CaCl_2$ brine may be used for slaking. After slaking, the larger particles present, known as grits, are removed by any suitable means such as by screening or by liquid cyclones and the slaked dolime is diluted with water or $CaCl_2$ brine to obtain a slurry containing the combined amount of calcium hydroxide and magnesium hydroxide in the range of 10 to 30 percent.

Calcium chloride solution containing from 10 to 30 weight percent is added in an amount such that the molar ratio of $Mg(OH)_2$ to $CaCl_2$ in the solution is at least about 0.7, and preferably not over 1.0, although a ratio of 1:1 may be used. It is essential that calcium chloride be present at the start of the carbonation and that some remain until the carbonation is completed. However, all of the calcium chloride need not be added prior to the starting of the carbonation but may be fed into the reaction vessel as carbonation proceeds. When the more concentrated slurry and solutions are used, an undesirably viscous mixture may be obtained with the addition of all of the desired calcium chloride at the beginning of the carbonation and efficiency is thereby decreased. With the presence of calcium chloride throughout the carbonation step, a product is obtained which has a whiteness of over 98 percent. In absence of calcium chloride throughout the whole carbonation step, the whiteness is generally from 2 to 4 percent less.

In carrying out the invention, there is required, as aforestated, not only the $CaCl_2$ and slaked dolime but between 0.5 and 15 parts, preferably between 5 and 10 parts (per 100 parts of slaked dolime on a dry weight basis) of previously prepared calcium carbonate crystals. With the addition of the previously prepared calcium carbonate crystals, the product obtained contains a mixture of aragonite and calcite crystals of calcium carbonate. Without the addition of the previously prepared $CaCO_3$, a product of substantially all calcite is obtained. These particles of calcite are generally larger in size. In the presence of 0.5 to 15 parts of previously prepared $CaCO_3$, the product obtained contains at least 15 percent and often as high as 80 percent aragonite crystals. A product containing from 40 to 60 weight percent of aragonite crystals is generally obtained when the previously prepared $CaCO_3$ is added in amount of from 5 to 10 parts per 100 parts of the slaked dolime, on a dry weight basis.

The carbonation is preferably carried out in a batch process. In accordance with the preferred practice, a part of the carbonated aqueous slurry mixture, containing $CaCO_3$ crystals which have the desired calcium carbonate particle size and size distribution, is generally retained in the reaction vessel and subsequently used in the following batch by adding the required slaked dolime and $CaCl_2$ thereto. Both the slaked dolime and $CaCl_2$ are preferably added as an aqueous slurry and solution, respectively, thereby providing the desired water to make the total solids desired and as a convenience. When a previous reaction mixture is not available, a limited amount of slaked dolime containing calcium chloride is carbonated without the presence of previously carbonated mixture and the resulting carbonated slurry is then added to a second batch which is carbonated. The second batch of carbonated product so made gives a satisfactory final product in accordance with the invention.

The carbonation is generally initiated at a temperature in the range of between about 20° and 35° C. and is carried out without appreciable cooling. The temperature increases with the carbonation and at the end of the carbonation the mixture is usually at a temperature in the range of between about 50° and 60° C. To effect carbonation, a gas stream containing at least 10 volume percent of carbon dioxide is used. Generally a flue gas is employed which may contain from 14 to 25 volume percent of $CO_2$. The carbonation is carried out with sufficient agitation of the dolime slurry to accomplish complete carbonation within from 8 to 20 hours. An optimum product is generally obtained when the carbonation is substantially completed in 10 to 15 hours using a gas stream containing from about 14 to 25 volume percent of carbon dioxide.

Under the above conditions of temperature, gas stream concentration, and time of carbonation, a distribution of particle size is obtained such that at least 25 percent of the calcium carbonate crystals are under 0.6 micron, at least 24 percent are larger than 1.5 microns, and essentially all of the crystals are less than 10 microns in size, with a median size of from 0.8 to 1.2 microns.

The optimum product of calcium carbonate as to pumpability and low adhesive requirement is one which contains from about 40 to 60 percent aragonite crystals and the remainder mainly calcite crystals. It is preferred that the size distribution be such that at least 35 percent of the crystals are less than 0.6 micron with the median size being in the range of from 0.8 to 1.2 microns.

It is unexpected that, upon the carbonation of the slaked dolime slurry in the presence of both previously carbonated mixture and of $CaCl_2$ in a batch process, the product obtained will contain aragonite crystals which otherwise will not be obtained in substantial quantities. It is also unexpected that the product obtained generally has a smaller median size and a wider size distribution than is obtained through conventional practice.

After carbonation, the calcium carbonate so made is most conveniently recovered by vacuum filtration. The filter cake obtained is washed and then repulped and vacuum filtered 3 to 6 additional times, preferably in the presence of a small amount, e.g., from 0.5 to 1.5 weight percent, of a dispersant. Any of the well known dispersants for aqueous media may be used, illustrative of which are casein, gum arabic and other natural gums, sodium silicate, and inorganic phosphates. The inorganic phosphates, e.g., sodium hexametaphosphate or sodium tetraphosphate, are generally preferred. After washing and dewatering (i.e., drawing out excess water by vacuum), a cake is obtained which usually contains at least about 70 percent calcium carbonate. Usually, after obtaining the high density filter cake, it is diluted back with water to give a slurry containing from 55 to 65 percent calcium carbonate. The slurry so made generally has a viscosity of about 2 to 5 poises measured on the Stormer viscosimeter and may be readily pumped. Very little settling of the slurry is obtained so that the slurry can be easily shipped by means of tank cars to the paper-treating plants where it may be removed from the tank cars by pumping, and thereafter diluted and intermixed with the adhesive and other ingredients as required.

Since casein is a common adhesive employed, the adhesive requirements are often stated in the terms of casein. The casein adhesive requirement of the product generally is in the range of from 10% to 20% lower than that normally required for calcium carbonate in the relative same particle size produced by other methods.

The following examples were performed, employing natural dolomite as the $Mg(OH)_2$ and $Ca(OH)_2$ source.

The dolime (calcined dolomite) employed in the examples was substantially a 1:1 molar CaO and MgO mixture which is, by weight, about 58 percent CaO and about 40 percent MgO. In each of the examples, the dolime and water were transferred to a slaker, provided with an agitator, an overflow line, and heat control means to maintain a temperature of about 90° C., in amounts to provide a weight proportion of dolime to water of about 1:5. The slaked dolime slurry thus obtained was passed through a liquid cyclone to remove oversize particles. The slurry was transferred to an upright cylindrical carbonating vessel, about 16 feet in diameter and 16 feet high, provided with an agitator, overflow line, heat control means and an inlet for a $CO_2$-containing gas. To the carbonating tank, a 20 percent by weight $CaCl_2$ solution was added, at the beginning of the carbonation, in an amount such that the molar ratio of $Mg(OH)_2$ of the dolime to $CaCl_2$ was about 1.0.

EXAMPLE 1

To show the effect of the presence of previously prepared $CaCO_3$, a series of six runs was made wherein the amount of previously prepared $CaCO_3$ present during the carbonation period was varied. The table below sets out the results obtained.

Table

| Run Number | 1 | 2 | 3 | 4 | 5 | 6 |
|---|---|---|---|---|---|---|
| Parts by weight of previously prepared $CaCO_3$ per 100 parts of slaked dolime on a dry weight basis | 0 | 0.38 | 0.76 | 1.7 | 38 | 101 |
| Percent by weight aragonite crystals in carbonated product | nil | nil | 27 | 31 | 33 | 27 |

The results set out in the table show that some previously prepared $CaCO_3$ is necessary to obtain measurable aragonite crystals. They further show that 0.38 part thereof per 100 parts of slaked dolime is insufficient and that satisfactory results are clearly attainable when employing no more than 0.76 part of previously prepared $CaCO_3$. By extrapolation it can be seen that at least about 0.5 part of previously prepared $CaCO_3$ per 100 parts of slaked dolime should be used. Accordingly, Runs 3 to 6 are illustrative of the practice of the invention whereas Runs 1 and 2 are for comparative purposes only.

EXAMPLE 2

The slaked dolime slurry employed in the runs of Example 1 was again employed. However, in the instant example, the slaked dolime slurry was admixed in the carbonating vessel with a previously carbonated mixture containing $CaCO_3$ crystals suspended therein, in accordance with the practice of the invention, such that about 6.5 weight percent of $CaCO_3$ was present on a dry slaked dolime basis.

The carbonation was effected by admitting flue gas containing 20 volume percent of carbon dioxide at a rate of 1 cubic foot of flue gas per minute per cubic foot of slurry. The initial carbonation temperature of the slurry was 34° C. which increased with carbonation until a temperature of approximately 55° C. was obtained near the end. After about 15 hours of carbonation, the product was filtered and the cake washed with water to remove soluble chlorides. A cake containing 40.2 weight percent of $CaCO_3$ was obtained. This product was repulped and refiltered five times. Following the fifth filtration the filter cake contained 70.5 weight percent $CaCO_3$. During each repulping operation, a small amount of the surfactant sodium tetraphosphate, was added. The dispersant was added just before each of the repulping steps to give a total amount of dispersant used of about 0.88 weight percent, based upon the weight of dry $CaCO_3$.

The product obtained had a median size of 0.97 micron and a whiteness of 98.0 percent. It contained from 50 to 60 percent aragonite, determined by X-ray diffraction pattern technique. The particle distribution obtained was as follows:

95.5% by weight less than 10 micron equivalent spherical diameter.
88% by weight less than 5 micron equivalent spherical diameter.
80% by weight less than 2 micron equivalent spherical diameter.
52% by weight less than 1 micron equivalent spherical diameter.
31% by weight less than 0.6 micron equivalent spherical diameter.

The 70% aqueous $CaCO_3$ slurry thus produced was diluted with water to a solids content of 65 percent. The viscosity of the 65 percent slurry was 4.0 poises.

The $CaCO_3$ product made in a run substantially identical with the example above, when used for treatment of paper, had a casein adhesive demand of 10 percent.

EXAMPLE 3

To illustrate the necessity of having $CaCl_2$ present during the entire carbonation period, as required by the invention, the example above was essentially repeated except that $CaCl_2$ was not added until after most of the $Ca(OH)_2$ had been carbonated. The $CaCl_2$ was then added in an amount to provide a molar ratio of $Mg(OH)_2$ to $CaCl_2$ of about 1.0. The product obtained had a particle size distribution similar to that above and a median particle size of 0.84 micron; it consisted of about 20 percent by weight aragonite and balance calcite crystals. The product, however, had a whiteness only of 94.5 percent.

EXAMPLE 4

To illustrate the effect of the absence of some $CaCO_3$ crystals on the particle size distribution of the resulting $CaCO_3$ a run was made, similar to Run No. 1 of Example 1, wherein no $CaCO_3$ from a previous batch was employed. The product obtained had a median particle size of 1.5 microns and a particle size distribution as follows:

99.6% by weight less than 10 micron equivalent spherical diameter.
96% by weight less than 5 micron equivalent spherical diameter.
64% by weight less than 2 micron equivalent spherical diameter.
33% by weight less than 1 micron equivalent spherical diameter.
10% by weight less than 0.6 micron equivalent spherical diameter.

Having described our invention, what is claimed and desired to be protected by Letters Patent is:

1. A calcium carbonate product consisting essentially of a mixture of calcite and aragonite crystals containing from 15 to 60 weight percent of aragonite crystals, said crystals having a medium particle size in the range of between about 0.8 and 1.2 microns with at least about 25 weight percent of the crystals being under 0.6 micron, at least about 13 weight percent greater than 2 microns, and substantially all of the crystals being less than 10 microns.

2. An aqueous calcium carbonate slurry consisting essentially of a mixture of calcite and aragonite crystals dispersed in water in the presence of a surfactant to give a pumpable slurry containing about 55 to 65 weight percent of calcium carbonate, said mixture of calcite and aragonite crystals containing from 15 to 60 weight percent of aragonite and the balance substantially calcite, and said crystals having a medium size in the range of between about 0.8 and 1.2 microns with at least about 25 weight percent of the crystals being under 0.6 micron, at least about 13 weight percent greater than 2 microns, and substantially all of the crystals less than 10 microns.

3. A process for the preparation of a calcium carbonate product, which comprises intermixing in an aqueous medium, by dry weight, (1) between 0.5 and 15 parts of previously prepared calcium carbonate crystals, (2) between 76 and 118 parts of calcium chloride, and (3) 100 parts of slaked dolime to provide a molar ratio of $Mg(OH)_2$ of the dolime to the $CaCl_2$ of between 0.7 and 1.1 and to provide a total dry solids of between 12 and 46 percent by weight to make an aqueous slurry; carbonating the resulting slurry by passing a gas therethrough which contains as the ingredient reactive therewith between about 10 and about 25 percent by volume $CO_2$ until the hydroxide present is all substantially converted to the carbonate, at a carbonating temperature which initially is in the range of between about 20° and about 35° C. and which does not subsequently exceed about 60° C., to obtain a calcium carbonate product consisting essentially a mixture of between about 15 and 80 weight percent of aragonite and the balance calcite crystals, having a median size of between 0.8 and 1.2 microns, between about 25 and 40 weight percent smaller than 0.6 micron, and at least about 13 weight percent greater than 2 microns; recovering the calcium carbonate product from the carbonated mixture, water-washing the product so obtained to remove soluble chloride therefrom; and successively repulping and recovering the product so obtained at least two additional times.

4. The process for the preparation of a pumpable calcium carbonate slurry consisting of admixing the calcium carbonate product consisting essentially of a mixture of calcite and aragonite crystals containing from 15 to 60 weight percent of aragonite crystals, said crystals having a median particle size in the range of between about 0.8 and 1.2 microns with at least about 25 weight percent of the crystals being under 0.6 micron, at least about 13 weight percent greater than 2 microns, and substantially all of the crystals being less than 10 microns with sufficient water to reduce the solids to about 65 percent by weight thereof and to impart a viscosity of not more than about 4 centipoises.

5. A process for the preparation of a calcium carbonate product, which comprises intermixing in an aqueous medium, by dry weight, (1) between 0.5 and 15 parts of previously prepared calcium carbonate crystals, (2) between 76 and 118 parts of calcium chloride, and (3) 100 parts of slaked dolime to provide a molar ratio of $Mg(OH)_2$ of the dolime to the $CaCl_2$ of between 0.7 and 1.1 and to provide a total dry solids of between 12 and 46 percent by weight to make an aqueous slurry; carbonating the resulting slurry by passing a gas therethrough which contains as the ingredient reactive therewith between about 10 and about 25 percent by volume $CO_2$ until the hydroxide present is all substantially converted to the carbonate, at a carbonating temperature which initially is in the range of between about 20° and about 35° C. and which does not subsequently exceed about 60° C., to obtain a calcium carbonate product consisting essentially of a mixture of between about 15 and 80 weight percent of aragonite and the balance calcite crystals, having a median size of between 0.8 and 1.2 microns, between about 25 and 40 weight percent smaller than 0.6 micron, and at least about 13 weight percent greater than 2 microns.

6. The calcium carbonate product of claim 1 which has a whiteness as compared to pure MgO at 100 percent, of at least 98 percent by standard reflectance tests.

7. The calcium carbonate product of claim 1 which has a casein adhesive requirement of less than 20 percent.

8. The calcium carbonate slurry of claim 2 which is readily pumpable and has a viscosity of not more than about 4.0 poises at room temperature when diluted to about a 65 percent total solids as measured on a Stormer viscosimeter.

References Cited by the Examiner
UNITED STATES PATENTS

| | | | |
|---|---|---|---|
| 2,538,802 | 1/51 | Schur et al. | 23—66 |
| 2,941,860 | 6/60 | Annis | 23—66 |

TOBIAS E. LEVOW, *Primary Examiner.*